Feb. 24, 1959  M. G. SCOTT  2,874,808
HYDRAULIC BRAKING APPARATUS
Filed May 14, 1953
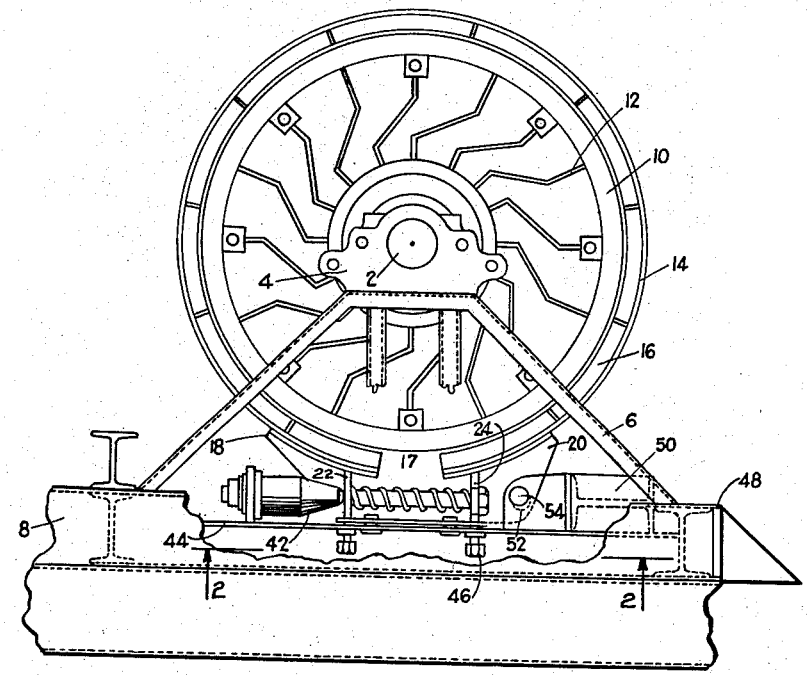
Fig. 1
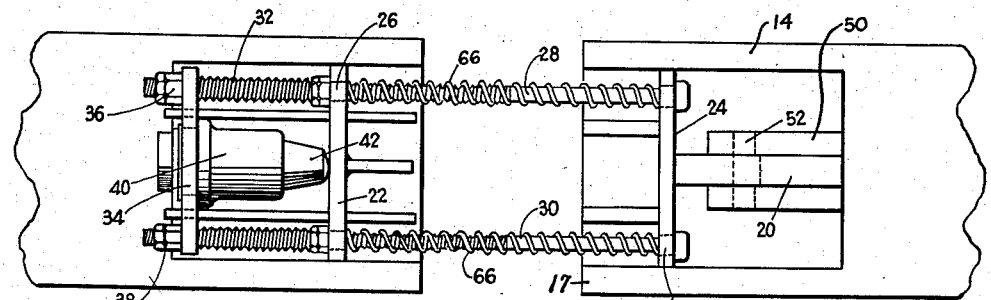
Fig. 2
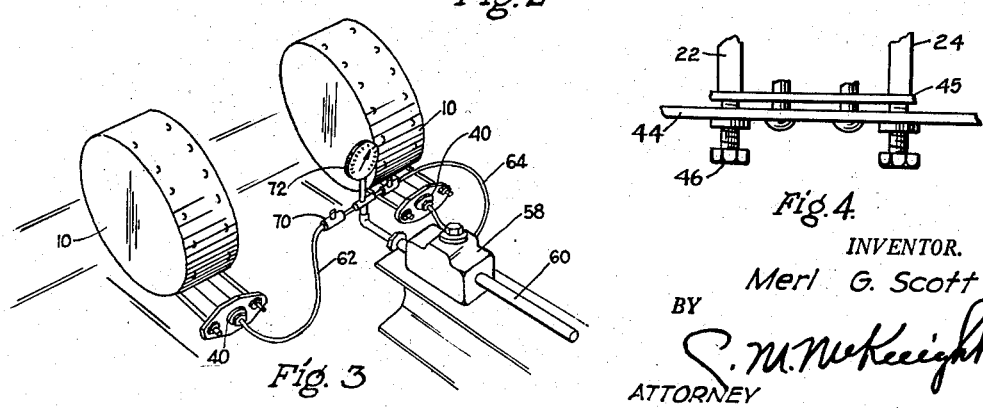
Fig. 3
Fig. 4
INVENTOR.
Merl G. Scott
BY
C. M. McKeight
ATTORNEY

United States Patent Office 2,874,808
Patented Feb. 24, 1959

2,874,808

HYDRAULIC BRAKING APPARATUS

Merl G. Scott, Tulsa, Okla., assignor, by mesne assignments, to Cabot Shops, Inc., Boston, Mass., a corporation of Massachusetts Application May 14, 1953, Serial No. 354,963

4 Claims. (Cl. 188—77)

This invention relates to braking apparatus, and more particularly, but not by way of limitation, to a hydraulic braking apparatus for use in oil field equipment, such as large brake drums on winches for portable draw works and the like.

As is well known, draw works apparatus utilized in the drilling of oil wells is usually quite large and the brake assembly in most instances utilizes a vertical lever cooperating with a ratchet bar for actuating a system of connecting levers to pull, or effect operation of the brake shoes into engagement with the rotating brake drum of the draw works apparatus. In equipment of this type, either a hydraulic or mechanical equalizer is interposed in the connecting lever system in order to assist, or smooth out the operation of the shoes with the drum in the braking engagement. This equalizer works simultaneously with movement of the control lever engaging the braking apparatus.

The present invention is generally concerned with a completely hydraulic apparatus for the application of brake shoes against a brake drum and completely eliminates the control lever and ratchet bar as well as cooperating linkage and auxiliary connecting levers and equalizing units.

It is an important object of this invention to provide a braking apparatus for use with large rotating drum equipment which is completely hydraulic in application.

And still another object of this invention is to provide a hydraulic braking apparatus where the application against the brake drum starts at the lower portion, or bottom of the circular disposed drums in order that the shoes can be more conveniently handled and placed together with less possibility of adjustment during assembly or disassembly.

And still another object of this invention is to provide a hydraulic braking apparatus utilizing a circular drum and brake shoes having the open gap portion disposed at the bottom of the shoe in order to eliminate accumulation of dirt, debris and the like in the braking apparatus.

And still another object of this invention is to provide a hydraulic brake which operates as a unit to effect efficient equalization, and accuracy of the brake application, and which brake apparatus is supported from its bottom in order to provide proper suspension of the brake bands and free rolling of the braking drum.

And still an additional object of this invention is to provide a completely hydraulic braking apparatus which is simple and durable in operation.

Other objects and advantages of the invention will be evident from the following detailed description, read in conjunction with the accompanying drawings, which illustrate my invention.

In the drawings:

Figure 1 is a side elevational view of the braking unit with certain parts broken away for clarity.

Figure 2 is a plan view as viewed from lines 2—2 of Fig. 1 with certain portions omitted for clarity.

Figure 3 is a schematic perspective view of a pair of brake drums and the actuating unit therefor.

Figure 4 is an enlarged detail view of the adjustable support means of the invention.

Referring to the drawings in detail, reference character 2 discloses a main shaft supported by usual bearings or pill boxes 4 in any suitable manner and in turn supported by the frame members 6 mounted on the skids 8 as will be hereinafter more fully set forth. A brake drum 10 is disposed on the rotating and/or stationary shaft 2 and is provided with the usual re-enforcing ribs 12. A brake band 14 encircles the drum 10 and is provided with a plurality of circumferentially disposed brake shoes 16 on the inner periphery of the band 14. The brake band 14 is provided with an open gap portion 17 at its lowermost or bottom side for purposes as will be hereinafter set forth.

Adjacent the gap portion 17, the brake band 14 is provided with a pair of oppositely disposed flanges 18 and 20 extending downwardly from the band. Each flange 18 and 20 is in turn provided with outwardly depending rib or flange portion 22 and 24 therefor. The rib members 22 and 24 are provided with a plurality of aligned apertures 26 for the reception of a pair of horizontal shaft members 28 and 30 having a portion thereof threaded as at 32. A plate 34 (Fig. 2) connects one end of the shaft members 28 and 30 by suitable nuts 36 and 38. It will be apparent that the plate 34 is provided with apertures (not shown) for the reception of the shafts 28 and 30.

A hydraulic cylinder 40 is carried by the plate 34 and disposed between the shafts 28 and 30. The cylinder 40 is provided with a piston having a tapered nose 42 bearing against one face of the plate 22 for a purpose as will be hereinafter set forth. The braking apparatus is supported on a plate 44. A second smaller plate member 45 is spaced slightly above the plate member 44 and contacts the flanges 22 and 24. Suitable adjusting screws 46 extend upwardly through the plate member 44 into contact with the under surface of the second plate member 45. It will be apparent that a vertical adjustment of the screws 46 will either raise or lower the plate member 45 as desired. Thus, the flange members 22 and 24 may be vertically positioned for adjustment of the shoes 16 relative to the brake drum 10. The hydraulic braking apparatus is mounted on the skid type of unit 8 which comprises an upstanding I-beam portion 48 carrying a beam 50 for anchoring the flange members 20 thereto. The flange member 20 is provided with a lost motion slot 52 cooperating with a pin 54 provided on the beam 50 in order to provide flexibility of movement between the flange 20 and the attendant brake shoes 16, particularly when the shoes become worn in a manner as will be hereinafter set forth.

Referring to Fig. 3, the actuator for the hydraulic control unit comprises a master cylinder 58 which is caused to function through a control lever 60 which is actuated either manually or automatically through any suitable means so that the hydraulic fluid from the master cylinder is forced through suitable conduits 62 and 64 to a hydraulic cylinder 40 for each particular brake drum 10. The brake drums in Fig. 3 are shown in dual application which is the usual situation in rotary draw works utilized for feeding pipe, bits and other tools into an oil well, and which customarily involves considerable weight and thus necessitates assurance of proper braking action.

The hydraulic fluid discharges through the lines 62 and 64 into the outer end of the cylinder 40, thereby forcing the piston and its tapered nose 42 into engagement with one side of the rib flange 22 providing a compression of the helical springs 66 encircling the shafts 28 and 30. The springs 66 are anchored between the flanges 22 and 24 as shown in Fig. 2 and are in compression therebetween at all times. Movement of the flange 20 provides a simultaneous movement of the flange 24 to cause engagement of the brake shoes 16 with the circular brake drum 10. The compression in the springs 66 is increased when the flanges 22 and 24 are moved in a direction toward each other for an engagement of the brake shoes 16 with the drum 10. When it is desired to release the brake shoes 16 from engagement with the drum 10, the hydraulic fluid may be relieved from the cylinder 40 by means of operation of the master cylinder 58 in any well known manner. The increased compression in the springs 66 bearing axially outward of the flanges 22 and 24 will urge the flanges in a direction away from each other and thus move the brake shoes 16 outwardly from the drum 10 and out of contact therewith. Since the pressure applied through the piston 42 is hydraulic, there is an equal application of pressure at all times to provide a constant engagement of the shoes.

In order to trap any hydraulic fluid that may be present in the conduits 62 and 64 and thereby maintain the brake shoes 16 in effective engagement with the drum 10, a valve unit 70 is provided for each brake. A pressure gauge 72 is interposed in the conduits, and the valves may be actuated either manually or by any suitable automatic means for closing off the fluid in the conduits and thereby trapping it for maintaining the effective engagement of the braking apparatus. The valves 70 may be automatically operated by any suitable electrical solenoid switch (not shown). It will be apparent that while the drawing shows the valve unit interposed in the conduits 62 and 64, the valve 70 may be interposed in the outlet conduit, unnumbered, leading from the master cylinder 58 to the gauge 72, if desired.

From the foregoing, it will be apparent that the present invention utilizes a hydraulic application for braking of hoisting drums and the like where there is an elimination of jerking or distortive force on the brake levers due to inefficient operation of mechanical linkage. Furthermore, in multiple band braking, there is a simplified hydraulic equalization of the braking action on the multiple bands which eliminates any mechanical equalizer and the attendent adjustments attached thereto. The present invention applies the hydraulic force equally on each of the multiple braking apparatus, as well as simultaneously through a central control hydraulic cylinder in order to assure that there is a constant, efficient, and equal application of brake pressure on the multiple units at all times. Furthermore, after once applying the braking action, such braking engagement can be maintained through suitable control units cooperating therewith.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A hydraulic braking apparatus comprising a pair of brake drums, a circular brake band disposed substantially around each drum, a plurality of brake shoes carried by each band, a hiatus provided in each band and disposed adjacent the lowermost portion of the respective drum, a pair of flanges extending downwardly from opposite sides of each hiatus and each of said flanges carrying a flange disposed perpendicular thereto, a plurality of shafts supported between the last mentioned flanges, a helical spring under compression encircling each shaft to maintain the band in disengagement with the drum, a hydraulic piston unit for each brake and comprising a hydraulically actuated piston disposed adjacent to and bearing against one of the last mentioned flanges, said pistons responsive to an application of hydraulic pressure to move the last mentioned flanges in one direction for placing the springs under increased compression and provide engagement of the shoes with the drum, a fluid circuit interconnecting the hydraulic piston units to provide simultaneous actuation of the pistons for simultaneous engagement of the brake shoes with each brake, and means for supporting the brake shoes and the hydraulic piston beneath the drum, said supporting means comprising a skid unit having a stationary beam member secured thereto beneath each drum, and a lost motion connection between the stationary beam members and one of the first mentioned flanges of each brake band for securing each brake band to the support means.

2. A hydraulic braking apparatus comprising a pair of brake drums, a circular brake band disposed substantially around each drum, a plurality of brake shoes carried by each band, a hiatus in each band and disposed adjacent the lowermost portion of the respective drum, a pair of flanges extending downwardly from opposite sides of each hiatus and each flange carrying a flange disposed perpendicular thereto, a plurality of shafts supported in the last mentioned flanges, helical springs under compression encircling each shaft to maintain the band in disengagement with the drum, a hydraulic piston unit for each brake and having a hydraulically actuated piston disposed adjacent to and bearing against one of the last mentioned flanges, said pistons responsive to an application of hydraulic pressure to move the respective flange in one direction for placing the springs under increased compression and provide engagement of the respective shoes with the respective drum, a fluid circuit interconnecting the hydraulic piston units to provide a simultaneous actuation of the pistons for a simultaneous engagement of the brake shoes with each brake drum, means for supporting the brake shoes and the hydraulic piston beneath the drum, a stationary beam member provided for the support means adjacent each brake, each of said stationary beams having a lost motion connection with one of said first mentioned flanges of each brake band to provide an adjustable connection between the drum and the brake band, and means for supplying hydraulic fluid to the fluid circuit.

3. A hydraulic braking apparatus comprising a brake drum having a circular brake band disposed therearound, a plurality of brake shoes carried by the band and adapted to engage the drum, a hiatus provided in the band and disposed adjacent the lowermost portion of the drum, resilient means connected to the band to provide for disengagement of the brake shoes with the drum, means cooperating with the band to provide a vertical adjustment thereof with respect to the drum, means adjacent the resilient means and in contact therewith for applying hydraulic pressure against the resilient means to effect an equal application of braking engagement by the shoes against the drum, means for supporting the resilient means and the hydraulic means beneath the brake band, said supporting means comprising a skid unit having a stationary beam secured thereto, said stationary beam provided with a lost motion slot for connection with the brake band to provide flexibility between the shoes and the drum.

4. A hydraulic braking apparatus comprising a pair of brake drums for use on an oil field draw works or the like, a brake band encircling each drum and having a plurality of brake shoes carried thereby, a hiatus in each band and disposed adjacent the bottom of the drum, flange means extending downwardly from opposite sides of each hiatus, resilient means disposed between said flange means to provide disengagement of the brake shoes with the drum, said resilient means comprising a plurality of helical springs under compression, a skid unit for supporting the resilient means beneath the brake bands, a beam secured to the skid unit adjacent each brake band and having a lost motion slot to provide an adjustable connection between one of said flange means and the beam for supporting the shoes, adjustable means supporting said flange means and permitting vertical adjustment thereof, a hydraulic means for each drum disposed on the skid unit and adapted to be actuated by hydraulic pressure to place the springs under increased compression and engagement of the brake shoes against each drum, and valve means disposed between the hydraulic supply and the hydraulic means to trap the hydraulic fluid and maintain the brake shoes in engagement with the drum.

References Cited in the file of this patent

UNITED STATES PATENTS

| | | |
|---|---|---|
| 1,673,211 | Staude | June 12, 1928 |
| 1,850,912 | Black | Mar. 22, 1932 |
| 1,956,433 | Young et al. | Apr. 24, 1934 |
| 2,187,181 | Shackelford | Jan. 16, 1940 |
| 2,237,095 | Casner | Apr. 1, 1941 |

FOREIGN PATENTS

| | | |
|---|---|---|
| 51,113 | France | Apr. 29, 1941 |
| | (Addition to #863,362) | |
| 14,001 | Great Britain | 1902 |
| 64,860 | Norway | May 26, 1942 |